(12) United States Patent
Fima et al.

(10) Patent No.: US 11,351,610 B2
(45) Date of Patent: *Jun. 7, 2022

(54) COMPOSITE COMPONENT FABRICATION USING INKJET PRINTING

(71) Applicant: NANO DIMENSIONS TECHNOLOGIES LTD., Nes Ziona (IL)

(72) Inventors: Sharon Fima, Moshav Neta'im (IL); Hila Elimelech, Moshav Avigdor (IL)

(73) Assignee: Nano Dimension Technologies, LTD., Nes Ziona (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/492,013

(22) PCT Filed: Mar. 7, 2017

(86) PCT No.: PCT/US2017/021145
§ 371 (c)(1),
(2) Date: Sep. 6, 2019

(87) PCT Pub. No.: WO2018/164672
PCT Pub. Date: Sep. 13, 2018

(65) Prior Publication Data
US 2020/0070245 A1    Mar. 5, 2020

(51) Int. Cl.
*B22F 10/10* (2021.01)
*B33Y 10/00* (2015.01)
*B29C 64/112* (2017.01)
*B29C 64/40* (2017.01)
*B33Y 40/00* (2020.01)
*B33Y 50/02* (2015.01)
(Continued)

(52) U.S. Cl.
CPC ............ *B22F 10/10* (2021.01); *B29C 64/112* (2017.08); *B29C 64/393* (2017.08); *B29C 64/40* (2017.08); *B33Y 10/00* (2014.12); *B33Y 40/00* (2014.12); *B33Y 50/02* (2014.12); *B33Y 70/00* (2014.12); *B22F 2304/054* (2013.01); *B22F 2304/056* (2013.01)

(58) Field of Classification Search
CPC ................ B22F 3/008; B22F 2304/054; B22F 2304/056; B22F 1/0022; B22F 1/0018; B33Y 10/00; B33Y 40/00; B33Y 50/02; B33Y 70/00; B33Y 70/10; B33Y 40/20; B29C 64/112; B29C 64/393; B29C 64/40; B29C 64/336
See application file for complete search history.

(56) References Cited

U.S. PATENT DOCUMENTS

| | | | |
|---|---|---|---|
| 10,893,612 B2 * | 1/2021 | Elimelech | ............... H05K 1/095 |
| 10,905,017 B2 * | 1/2021 | Shabtai | .................. B33Y 10/00 |
| 2014/0079841 A1 | 3/2014 | Pridoehl et al. | |

(Continued)

FOREIGN PATENT DOCUMENTS

WO    2015081343 A1    6/2015

*Primary Examiner* — Rebecca Janssen
(74) *Attorney, Agent, or Firm* — Guy Levi; The IP Law Firm of Guy Levi, LLC (57) ABSTRACT

The disclosure relates to methods and compositions for direct printing of composite components. Specifically, the disclosure relates to the continuous printing of colored resin and metallic composite components using inkjet printing.

19 Claims, 1 Drawing Sheet

(51) Int. Cl.
*B33Y 70/00* (2020.01)
*B29C 64/393* (2017.01)

(56) References Cited

U.S. PATENT DOCUMENTS

| | | |
|---|---|---|
| 2015/0081347 A1 | 3/2015 | Rosenblatt |
| 2015/0197062 A1 | 7/2015 | Shinar et al. |
| 2016/0243619 A1* | 8/2016 | Gothait .................. C09D 11/03 |
| 2017/0136706 A1 | 5/2017 | Hakkaku et al. |

* cited by examiner

COMPOSITE COMPONENT FABRICATION USING INKJET PRINTING

CROSS REFERENCE TO RELATED APPLICATIONS

This patent application is a U.S. National Phase filing of commonly owned and pending PCT Application No. PCT/US17/21145, filed Mar. 7, 2017, which is incorporated herein by reference in its entirety.

BACKGROUND

The disclosure is directed to methods and compositions for direct printing of composite components. Specifically, the disclosure is directed to the printing of colored resin and metallic 3D composite components, using inkjet printing.

Over the past few years, additive manufacturing and free-form fabrication processes have experienced some significant advances in terms of fabricating articles directly from computer-controlled media. For instance, rapid prototyping techniques allow many articles (e.g., prototype parts and mold dies) to be fabricated more quickly and cost effectively than conventional machining processes that require blocks of material to be specifically machined in accordance with engineering drawings.

Additive Manufacturing (AM), similarly to other rapid prototyping techniques, conventionally involves the use of a three dimensional (3D) computer aided design (CAD) of a component/part to be made, from which a stereolithography (STL) or other suitable format file is generated within a CAD package. The STL file can then be processed and in effect virtually sliced in the Z-axis at a thickness matching the thickness of the systems' capabilities. This creates a series of plan cross sections layer of the part and at any particular height, each having a simple two dimensional (2D) profile.

Additive manufacturing processes allow for highly complex geometries to be created directly (without tooling) from 3D CAD data, thereby permitting the creation of articles exhibiting high resolution surfaces. While these processes have been useful for detailing various surface properties of produced articles, such processes have struggled to produce complex composite articles both in terms of metallic components, resinous components and colored components when all are incorporated into the article sought to be fabricated. Thus, there is a need for materials devices and methods enabling efficient and precise fabrication of complex articles of composite components.

SUMMARY

Disclosed, in various embodiments, are methods of forming or fabricating colored composite components comprising metal and resin using inkjet printing, as well as embodiments of inkjet ink compositions facilitating the fabrication of colored composite components.

In an embodiment provided herein is a method for fabricating a 3D colored resin-metal composite component using inkjet printer comprising: providing an ink jet printing system comprising: a first print head having: at least one aperture, a resin ink reservoir, and a resin pump configured to supply resin inkjet ink through the aperture; a second print head having: at least one aperture, a metallic ink reservoir, and a metallic ink pump configured to supply the metallic inkjet ink through the aperture; a third print head having: at least one aperture, a support ink reservoir, and a support ink pump configured to supply the support inkjet ink through the aperture; a conveyor, operably coupled to the first, the second and the third print heads configured to convey a substrate to each of the first, second, and third print heads; and a computer aided manufacturing ("CAM") module, comprising: a data processor; a non-volatile memory; and a set of executable instructions stored on the non-volatile memory for: receiving a 3D visualization file representing the composite component; generating a file that represents at least one, substantially 2D layer for printing the composite component; receiving a selection of parameters related to the composite component; and altering the file represents at least one, substantially 2D layer based on at least one of the selection of parameters, wherein the CAM module is configured to control each of the first, second and third print heads; providing the colored resin inkjet ink composition, the metallic inkjet ink composition and the support inkjet ink composition; using the CAM module, obtaining a generated file representing a first, substantially 2D layer of the composite component for printing, the 2D layer comprising a pattern representative of the colored resin inkjet ink, the metallic inkjet ink and the support inkjet ink; using the first print head, forming the pattern corresponding to the resin representation in the first, substantially 2D layer of the composite component for printing; curing the pattern corresponding to the resin representation in the 2D layer of the composite component; using the second print head, forming the pattern corresponding to the metal representation in the first, substantially 2D layer of the composite component for printing; sintering the pattern corresponding to the metal representation in the 2D layer of the composite component; removing the substrate, thereby fabricating a first composite component layer, wherein, before, simultaneously with or sequential to the steps of forming and the pattern corresponding to the resin representation in the first, substantially 2D layer of the composite and/or the steps of forming and sintering pattern corresponding to the metal representation in the first, substantially 2D layer of the composite, using the third print head, forming the pattern corresponding to the support representation in the first, substantially 2D layer of the composite component for printing and functionalizing the pattern corresponding to the metal representation in the 2D layer of the composite component.

In another embodiment, the resin ink can be a solution of photopolymerizable monomers, oligomers or their combination, a colloidal dispersion of high-molecular weight polymers, a polymer solution or a combination thereof, either in a single resin ink composition, or in separate resin ink—dedicated print heads.

In an embodiment, the metallic ink can be a dispersion of metallic nanoparticles in solvent or a metallic precursor solution or dispersion or a combination thereof.

In yet another embodiment, the inkjet printing system further comprises yet an additional print head having: at least one aperture, a support ink reservoir, and a support ink pump configured to supply the support ink through the aperture, the method further comprising: providing a support ink composition; before, subsequent or simultaneously to the step of using the first print head, using the support ink print head, forming a predetermined pattern corresponding to the support representation in the first, substantially 2D layer of the composite component for printing; and curing the predetermined pattern corresponding to the support representation in the 2D layer of the composite component.

Further, provided herein are embodiments of composite components fabricated using the method.

In an embodiment, the resin ink can be a suspension comprising a dispersed phase comprising: plurality of primary porous particulates impregnated with a monomer, an oligomer, a polymer or a combination comprising the foregoing, wherein the monomer, oligomer, polymer or a combination thereof has a first terminal end coupled to the porous particulate and a functional second terminal end; a continuous phase, comprising: multifunctional acrylate monomer, oligomer, polymer or their combination; a crosslinking agent and a radical photoinitiator, wherein the monomer, oligomer, polymer or their combination impregnated in the porous particulates is partially soluble in the continuous phase or is thermodynamically incompatible with a material forming the particulates.

These and other features of the methods and compositions for using inkjet printing for fabricating colored resin-metal composite components and/or articles, will become apparent from the following detailed description when read in conjunction with the figures and examples, which are exemplary, not limiting.

BRIEF DESCRIPTION OF THE FIGURES

For a better understanding of the colored resin-metal fabrication methods and compositions, with regard to the embodiments thereof, reference is made to the accompanying examples and figures, in which.

DETAILED DESCRIPTION

Provided herein are embodiments of methods, compositions and kits for using inkjet printing device for fabricating colored resin-metal composite components.

The methods described herein can be used to form the colored resin-metal composite components in a continuous additive manufacturing process using the inkjet printing device, or using several passes. Using the methods described herein, a thermoset resin material can be used to form the resin portion of the composite component, which is typically formed and colored simultaneously in one embodiment, or separately colored in another embodiment, and provided as a separate part for further assembly. Using the methods and compositions described herein, that separate fabrication and assembly can be eliminated and, using the methods and compositions described herein, better control and more rapid prototyping over the composite component is achieved.

Accordingly and in an embodiment, provided herein is a method for fabricating a 3D colored resin-metal composite component using inkjet printer comprising: providing an ink jet printing system comprising: a first print head having: at least one aperture, a resin ink reservoir, and a resin pump configured to supply resin inkjet ink through the aperture; a second print head having: at least one aperture, a metallic ink reservoir, and a metallic ink pump configured to supply the metallic inkjet ink through the aperture; a third print head having: at least one aperture, a support ink reservoir, and a support ink pump configured to supply the support inkjet ink through the aperture; a conveyor, operably coupled to the first, the second and the third print heads configured to convey a substrate to each of the first, second, and third print heads; and a computer aided manufacturing ("CAM") module, comprising: a data processor; a non-volatile memory; and a set of executable instructions stored on the non-volatile memory for: receiving a 3D visualization file representing the composite component; generating a file that represents at least one, substantially 2D layer for printing the composite component; receiving a selection of parameters related to the composite component; and altering the file represents at least one, substantially 2D layer based on at least one of the selection of parameters, wherein the CAM module is configured to control each of the first, second and third print heads; providing the colored resin inkjet ink composition, the metallic inkjet ink composition and the support inkjet ink composition; using the CAM module, obtaining a generated file representing a first, substantially 2D layer of the composite component for printing, the 2D layer comprising a pattern representative of the colored resin inkjet ink, the metallic inkjet ink and the support inkjet ink; using the first print head, forming the pattern corresponding to the resin representation in the first, substantially 2D layer of the composite component for printing; curing the pattern corresponding to the resin representation in the 2D layer of the composite component; using the second print head, forming the pattern corresponding to the metal representation in the first, substantially 2D layer of the composite component for printing; sintering the pattern corresponding to the metal representation in the 2D layer of the composite component; removing the substrate, thereby fabricating a first composite component layer, wherein, before, simultaneously with or sequential to the steps of forming and the pattern corresponding to the resin representation in the first, substantially 2D layer of the composite and/or the steps of forming and sintering pattern corresponding to the metal representation in the first, substantially 2D layer of the composite, using the third print head, forming the pattern corresponding to the support representation in the first, substantially 2D layer of the composite component for printing and functionalizing the pattern corresponding to the metal representation in the 2D layer of the composite component.

As indicated, the resin ink used in the methods and systems for fabricating colored resin-metal composite articles and components can be tinted using a predetermined color. Using the CAM module, a print head containing the appropriate colored resin can be selected for printing. Likewise, other print heads with reservoirs having the same resin with a different color, a different resin with the same color or different resin with a different color can form a part of the inkjet printing systems used to facilitate the methods described. Under certain circumstances, when higher throughput fabrication is desired, multiple print heads of the colored resin ink, and/or the metallic inks of, for example, metal nanoparticle suspended in the presence of a solvent, can be used, selected and controlled by the CAM module.

Alternatively, or additionally, the inkjet printing system used in the methods and systems for fabricating colored resin-metal composite articles and components, can further comprises a third print head having: at least one aperture, a coloring ink reservoir, and a coloring pump configured to supply the coloring inkjet ink through the aperture, the method further comprising: providing coloring ink composition; and before or after the step of curing the predetermined pattern corresponding to the resin representation in the 2D layer of the composite component, using the third print head, coloring the layer of the composite component. Moreover, coloring the resin ink compositions can take place before or after the curing step.

Furthermore, the methods of forming the colored resin-metal composite components described herein can further comprise a step of providing a peelable, or removable substrate, prior to the step of using the first print head, and/or the second print head. The term "peelable" refers in an embodiment to materials that can be removably applied to and adhere to surfaces such as the surface created by the method, compositions and kits for forming colored resin-metal composite components described herein and can be subsequently removed from that surface by force. Peelable films according to the compositions and methods of this invention can be adhesively and removably applied to a chuck disposed on the printer's conveyor belt and, by virtue of being forcibly removed, expose a layer of the colored resin-metal composite components.

The removable substrate can also be a powder, for example, a ceramic powder, which can be applied to the chuck, compacted and later removed. The choice of substrate can depend, for example on the final composite components' use and structure. Furthermore, the removal of the substrate can take place at the end of the fabrication of the whole component, the fabrication of the first 2D layer, or at any stage in between.

The method of forming the colored resin-metal composite components can, as described above, comprise the step of providing a substrate (e.g., a peelable film). The print head (and derivatives thereof; are to be understood to refer to any device or technique that deposits, transfers or creates material on a surface in a controlled manner) depositing the resin and/or metallic ink can be configured to provide the ink droplet(s) upon demand, in other words, as a function of various preselected process parameters such as conveyor speed, desired metallic layer thickness, layer type, layer color and the like. The removable or peelable substrate can also be a relatively rigid material, for example, glass or crystal (e.g., sapphire). Additionally, or alternatively, the peelable substrate may be a flexible (e.g., rollable) substrate (or film) to allow for an easy peeling of the substrate from the colored resin-metal composite components, for example, poly(ethylenenaphthalate) (PEN), polyimide (e.g. KAPTONE® by DuPont), silicon polymers, poly(ethyleneterphtalate) (PET), poly(tetrafluoroethylene) (PTFE) films etc. Moreover, the substrate can be, for example a ceramic powder.

In fabricating or forming the colored resin-metal composite articles and components described herein, by depositing substantially 2D layers of a component resin and/or metal materials, supporting layers or structures can be deposited as part of the substantial 2D representation of the colored resin-metal composite articles and components described herein. This support can be removable and be positioned underneath subsequently printed overhanging portions or in prospective cavities, which are not supported by the part or component material itself. A support structure may be built utilizing the same deposition techniques by which the part material is deposited. In an embodiment, the CAM module can generate additional geometry acting as a support structure for the overhanging or free-space segments of the 3D visualization file representing the composite component being formed, and in other circumstances, for the sidewalls of the colored resin-metal composite articles and components being formed. The support material can be configured to, for example, adhere to the part material during fabrication, and be removable from the completed colored resin-metal composite articles and components described herein when the printing process is completed.

The term "support" as used herein refers to one or more layers of a support material used to provide structural support to the plurality of layers of built colored resin and/or metal materials, during the fabrication of the colored resin-metal composite articles and components described herein.

For example, the support material can be a wax including at least one functional group capable of reacting with the resin ink material, when exposed to the actinic radiation used for curing of the resin ink material. In some embodiments, the functional group in the wax is capable of reacting with the build material in the presence of a photoinitiator typically used for curing of the build material, and subsequent formation of the 3D article and later melted under mild heating and removed. Additional support materials can be, for example, non cross-linked, solvent/water soluble material, which allows support structures to be relatively easily washed away—once the print process is complete. Alternatively or additionally, breakaway support materials can also be possible, which can be removed by manually snapping them off the part.

In other embodiments, the support material used in the methods and systems for fabricating colored resin-metal composite articles and components described herein can be transparent to actinic radiation to accommodate "backflash" exposure through the support. In an embodiment, "actinic radiation" refers to an energy beam capable of curing a resin ink composition for stereolithography such as ultraviolet ray, electron beam, X-ray or radial ray. Accordingly, the term "actinic radiation-curable resin composition" to be used in producing the colored resin-metal composite articles and components described herein, can be a resin composition which is cured upon irradiation with one or more actinic radiations (energy beams) as described above.

Such a back exposure results in curing at least a part of the photopolymerizable resin ink composition in the layers nearest to the support. Examples of suitable support materials include polymeric films such as those formed by addition polymers and linear condensation polymers and transparent foams. Polymeric supports for use in the methods described herein, can be cellulose acetate propionate, cellulose acetate butyrate, polyesters such as polyethylene terephthalate (PET) and polyethylene naphthalate (PEN); oriented polystyrene (OPS); oriented nylon (ONy); polypropylene (PP), oriented polypropylene (OPP); polyvinyl chloride (PVC); and various polyamides, polycarbonates, polyimides, polyolefins, poly(vinylacetals), polyethers and polysulfonamides, and opaque white polyesters. Acrylic resins, phenol resins, glass and metals may also be used as an ink-receiver.

Depending on the material used in the support, using an aqueous dispersion on top of a water/solvent-soluble polymer film forming the support surface may not be feasible. In those circumstances, deposition of a resin material in a non-polar solvent can be performed, for example Poly(4-vinylphenol) dissolved in 1-metyl-2-pyrrolidin). Alternatively, Poly(vinyl fluoride) (PVF, PVDF) and/or polyamides could also possibly have the potential to serve as an inkjet printable resin ink. Additionally or alternatively, ceramic particles can be suspended in a soluble polymer solution and be configured to form a rigid support upon functionalizing of the support using, for example various curing techniques described herein and others. The rigid ceramic-in-polymer support can later be similarly removed by solubilizing the polymer. Ceramic powder, can be used in itself as the support under certain embodiments as well, either as a aqueous suspension, with an organic solvent or on its own.

Accordingly and in an embodiment, the inkjet printing system used in the methods and systems for fabricating colored resin-metal composite articles and components can further comprise yet an additional functional print head having: at least one aperture, a support ink reservoir, and a support ink pump configured to supply the support ink through the aperture. Using the additional support ink head, the method can further comprise providing a support ink composition; either subsequent, sequentially or simultaneously to the step of using the first print head, the second print head, or any other functional print head (and any permutation thereof), using the support ink print head, forming a predetermined pattern corresponding to the support representation generated by the CAM module from the 3D visualization file and represented as a pattern in the first, substantially 2D layer of the composite component for printing. The predetermined pattern corresponding to the support representation can then be further treated (e.g., cured, cooled, crosslinked and the like), to functionalize the pattern as support as described hereinabove in the 2D layer of the composite component. The process of depositing the support can be repeated thereafter for every sequential layer as needed.

The term "forming" (and its variants "formed", etc.) refers in an embodiment to pumping, injecting, pouring, releasing, displacing, spotting, circulating, or otherwise placing a fluid or material (e.g., the metallic ink) in contact with another material (e.g., the substrate, the resin or another layer) using any suitable manner known in the art.

Likewise, other functional heads may be located before, between or after the resin print head and/or the metallic (metal containing) print head These may include a source of electromagnetic radiation configured to emit electromagnetic radiation at a predetermined wavelength ($\lambda$), for example, between 190 nm and about 400 nm, e.g. 365 nm which in an embodiment, can be used to accelerate and/or modulate and/or facilitate a photopolymerizable resin that can be used on conjunction with metal nanoparticles dispersion used in the metallic ink. Other functional heads can be heating elements, additional printing heads with various inks (e.g., pre-soldering connective ink, label printing of various components for example capacitors, transistors and the like) and a combination of the foregoing.

For example, the additional printing head can be colorizing print head, comprising a color ink composition configured to color the resin portion. The color ink composition can be configured to coat a portion of the resin portion of the colored resin-metal composite components. In other words, the coloring print head can be configured in one embodiment to tint the resin composition such that the color is spread evenly throughout the resin portion of the colored resin-metal composite components, or, in another embodiment, only coat the visible portion of the resin component once the colored resin-metal composite components are assembled. Similar configuration can be used for the metal/metallic ink compositions to achieve similar results. Accordingly; and in yet another embodiment, the inkjet printing system used in the methods and systems for fabricating colored resin-metal composite articles and components described herein can further comprise a third print head having: at least one aperture, a coloring ink reservoir, and a coloring pump configured to supply the coloring inkjet ink through the aperture, the method further comprising: providing coloring ink composition; and before or after the step of curing the predetermined pattern corresponding to the resin representation in the 2D layer of the composite component, using the third print head, coloring the layer of the composite component.

As indicated, the systems used to implement the methods for fabricating colored resin-metal composite articles and components can have additional metallic ink print heads, which may contain different metals. For example, the second print head as described herein can comprise a Silver (Ag) nanoparticles while an additional print head for metallic ink may comprise different metal, e.g., Copper or Gold. Likewise, other metals (e.g., Al) or metal precursors can also be used and the examples provided should not be considered as limiting. Accordingly, the inkjet printing system further comprises yet an additional print head having: at least one aperture, a second metallic ink reservoir, and a second metallic ink pump configured to supply the second metallic ink through the aperture. Consequently, the methods can further comprise providing a second metallic ink composition; using the second metallic ink print head, forming a predetermined pattern corresponding to the second metal representation in the first, substantially 2D layer of the composite component for printing; and sintering the predetermined pattern corresponding to the second metal representation in the 2D layer of the composite component. The second metallic ink composition can have a different metal than the metallic ink composition in the second print head, or in another embodiment; and in order to achieve higher throughput, the second metallic ink composition can be identical in all metallic print heads.

In an embodiment, the third coloring print head can be a common inkjet print head module configured to operate as either a single-color or multi-color inkjet print head. The common module can have an ink cartridge and an inkjet chip. The ink cartridge can have a cartridge body (with one or more reservoir(s) for coloring ink). The cartridge body internally can have a plurality of ink channels that externally terminate through a surface of the ink output (in other words, orifice plate).

In addition, all printing heads and the method of forming the colored resin-metal composite component(s), can be configured to take place in a housing having controlled atmosphere therein. Likewise, controlled atmosphere can be affected by the resin ink formulation itself.

Other similar functional steps (and therefore means for affecting these steps) may be taken before or after each of the resin ink or metallic ink print heads (e.g., for sintering the metallic layer). These steps may include (but not limited to): a heating step (affected by a heating element, or hot air); photobleaching (of a photoresist mask support pattern), photocuring, or exposure to any other appropriate actinic radiation source (using e.g., a UV light source); drying (e.g., using vacuum region, or heating element); (reactive) plasma deposition (e.g., using pressurized plasma gun and a plasma beam controller); cross linking such as {4-[(2-hydroxytetradecyl)-oxyl]-phenyl}-phenyliodonium hexafluoro antimonate to a resin polymer solutions prior to coating or used as dispersant with the metal precursor or nanoparticles); annealing, or facilitating redox reactions. In certain embodiment, a laser (for example, selective laser sintering/melting, direct laser sintering/melting), or electron-beam melting can be used on either the resin or the metallic portion. It should be noted, that sintering of the metallic portions can take place even under circumstances whereby the metallic portions are printed on top of a resinous portion of the composite component.

It should be noted, that metallic layers can be deposited among the resin layers, separately and distinct from a coating pattern above the resin layer. For example, a metallic layer can be deposited over a support layer, which following removal, will be independent of any resin material.

Accordingly, in an embodiment, the steps of using the first print head and depositing the metallic inkjet ink onto the substrate, thereby forming a first printed metallic pattern layer and/or the step of depositing the resin-containing inkjet ink onto the removable substrate, and/or or removable support, is preceded, followed or takes place concurrently with a step of heating, photocuring drying, depositing plasma, cross linking, annealing, facilitating redox reactions, sintering, melting or a combination of steps comprising one or more of the foregoing. The pre-, or post portion treatment (in other words, functionalizing the resin and/or metallic and/or support portions) can take place either before or after the step of using the coloring print head(s), the additional resin ink print head(s), the additional metallic ink print head(s) or their permutations.

Formulating the metallic ink composition, may take into account the requirements, if any, imposed by the deposition tool (e.g., in terms of viscosity and surface tension of the composition) and the deposition surface characteristics (e.g., hydrophilic or hydrophobic, and the interfacial energy of the peelable or removable substrate or the support material used). Using ink-jet printing with a piezo head, the viscosity of either the metallic ink and/or the resin-forming inkjet ink (measured at 20° C.) can be, for example, not lower than about 5 cP, e.g., not lower than about 8 cP, or not lower than about 10 cP, and not higher than about 30 cP, e.g., not higher than about 20 cP, or not higher than about 15 cP. The metallic ink, can each be configured (e.g., formulated) to have a dynamic surface tension (referring to a surface tension when an ink-jet ink droplet is formed at the print-head aperture) of between about 25 mN/m and about 35 mN/m, for example between about 29 mN/m and about 31 mN/m measured by maximum bubble pressure tensiometry at a surface age of 50 ms and at 25° C. The dynamic surface tension can be formulated to provide a contact angle with the peelable substrate, the support material, the resin layer(s), or their combination, of between about 100° and about 165°.

Using a metallic composition in the methods of fabricating colored resin-metal composite components as described herein, can be composed essentially of solvent-suspended metallic copper, silver, aluminum nanoparticles, or metallic inkjet ink compositions comprising one or more of the foregoing and other metals (e.g., Group IA (1) of the periodic table), a binder, and a solvent, wherein the diameter, shape and composition ratio of the nanoparticles in the ink are optimized, thus enabling the formation of a layer, or dense printed pattern. It should be noted that choice of metal ink will depend on the final characteristics of the 3D composite component sought to be printed. These particles can be in a size range suitable for the desired applications. In an embodiment, metallic portion patterns formed using silver are printed using inks of nanosilver suspensions. The metallic portion of the 2D representation of the colored resin-metal 3D composite component can be significantly enhanced in quality during sintering by, for example, the silver nanoparticles having thin or small features with high aspect ratios. In other words, by having metallic nanoparticles with aspect ratio R is much higher than 1 (R>>1). Having the high aspect ratio can create an alignment of the nanoparticles due to, for example, flow orientation of the ink in the direction of motion of the substrate on a chuck, or in another embodiment, by the ejection process from the print head's orifice.

In an embodiment, the term "chuck" is intended to mean a mechanism for supporting, holding, or retaining a substrate or a workpiece. The chuck may include one or more pieces. In one embodiment, the chuck may include a combination of a stage and an insert, a platform, be jacketed or otherwise be configured for heating and/or cooling and have another similar component, or any combination thereof.

In an embodiment, the ink-jet ink compositions and methods allowing for a continuous or semi-continuous ink-jet printing of a colored resin-metal 3D composite components can be patterned by expelling droplets of the liquid ink-jet ink provided herein from an orifice one-at-a-time, as the print-head (or the substrate) is maneuvered, for example in two (X-Y) (it should be understood that the print head can also move in the Z axis) dimensions at a predetermined distance above the removable substrate or any subsequent layer. The height of the print head can be changed with the number of layers, maintaining for example a fixed distance. Each droplet can be configured to take a predetermined trajectory to the substrate on command by, for example a pressure impulse, via a deformable piezo-crystal in an embodiment, from within a well operably coupled to the orifice. The printing of the first inkjet metallic ink can be additive and can accommodate a greater number of layers. The ink-jet print heads provided used in the methods described herein can provide a minimum layer film thickness equal to or less than about 3 μm-10,000 μm Similarly, the term "contacting" is used in an embodiment to refer to materials which may be blended, mixed, slurried, dissolved, reacted, treated, or otherwise contacted in some other manner. Therefore, the term "contacting" encompasses the "reacting" of two or more components, and it also encompasses the "mixing" or "blending" of two or more components that do not react with one another.

The conveyor maneuvering among the various print heads used in the methods described and implementable in the systems described can be configured to move at a velocity of between about 5 mm/sec and about 1000 mm/sec. The velocity of the e.g., chuck can depend, for example, on: the desired throughput, the number of print heads used in the process, the number and thickness of layers of the colored resin-metal composite components printed, the curing time of the ink, the evaporation rate of the ink solvents, the distance between the print head(s) containing the first ink-jet metallic ink of the metal particles or metallic polymer paste and the second print head comprising the second, thermoset resin and board forming inkjet ink, and the like or a combination of factors comprising one or more of the foregoing.

In an embodiment, the dynamic viscosity of the metallic ink composition, and/or the second, resin ink, and/or the third, coloring ink can each be between about 0.1 and about 30 cP·s (mPa·s), for example the final ink formulation can have a viscosity of 8-12 cP·s at the working temperature, which can be controlled. For example, the metallic nanoparticles dispersion, solution, emulsion, suspension, or liquid composition comprising the foregoing, or the resin inkjet ink can each be between about 5 cP·s and about 25 cP·s, or between about 7 cP·s and about 20 cP·s, specifically, between about 8 cP·s and about 15 cP·s.

In an embodiment, the volume of each droplet of the metallic (or metallic) ink, and/or the second, resin ink, can range from 0.5 to 300 picoLiter (pL), for example 1-4 pL and depended on the strength of the driving pulse and the properties of the ink. The waveform to expel a single droplet can be a 10V to about 70 V pulse, or about 16V to about 20V, and can be expelled at frequencies between about 2 kHz and about 500 kHz.

The resin ink can be configured to be stable within a print head reservoir. For example, the solid contents (i.e., suspended solids if colloidal suspension, or solute if a solution) can be between about 5 and about 100 wt % Likewise, the suspended ink solids in other words, latex inks, can be uniformly dispersed in the solvent by additional suitable surfactant. Conversely, suitable surfactants may not be necessary and the ink can be 100% active, by incorporating photoactive monomers/oligomers and their combination, in which no appreciable sedimentation can take place. Further, the ink viscosity can be adjusted to facilitate ejection of droplets. Accordingly, in an embodiment, the surface energy ($\gamma$) together with dynamic viscosity ($\mu$) of the resin ink solutions used in the methods of forming the colored resin-metal composite components described herein can be in the range of between about 25 mN/m and about 35 mN/m and between about 8 mNs/m$^2$ (cP) and about 15 mNs/m$^2$ (cP), respectively. Inks used in certain embodiments, which are comprised of suspended sub-micron particles, for example in the pigment coloring inks and metallic particles inks, as well as, in some embodiments, the resin inks can be configured to facilitate optimal operation as determined by some thresholds (e.g., nozzle orifice and nozzle neck) inside micro liquid channels of the print head(s).

In an embodiment, the resin-forming ink used in the methods implementable in the systems described herein, can be a suspension composition comprising: a dispersed phase comprising a plurality of porous particulates impregnated with embedded monomer, oligomer, or a combination comprising the foregoing, wherein the monomer, oligomer or a combination thereof has a first terminal end coupled to the porous particulate and a second, functional terminal end, wherein the monomer, oligomer, polymer, or their combination that is operably coupled to the porous particulates are entirely embedded within the particulates and configured to leach out of the porous particulate at a temperature of between about 60° C. and about 150° C.; and a continuous phase comprising: multifunctional acrylate monomer, oligomer, polymer or their combination; a cross-linking agent; and a radical photoinitiator, wherein the monomer, oligomer, polymer or their combination impregnated in the porous particulates is partially soluble in the continuous phase and/or is thermodynamically incompatible with a material forming the particulates.

In an inactivated state, the monomer, oligomer, polymer, or their combination is entirely embedded within porous particulates and upon heating, or activation, the live monomer, live oligomer, live polymer or their combination partially leaches out of the porous particulates. Accordingly, the monomer, oligomer, polymer, or their combination is not coupled to the porous particulates by surface modification or surface functionalization of the porous particulates, but rather, through internal modification i.e., physical linkage, forming in an embodiment an integrated hybrid particle. Under these circumstances, it is possible to provide the suspension in combination with a curing agent, or a cross-linking agent, a live, or active co-monomer, co-oligomer, co-polymer or a composition comprising one or more of the foregoing, without thermosetting the mixture. Moreover, by embedding the monomer, oligomer, polymer, or their combination inside the porous particulate used for reinforcing the resin, the reinforcement particulates become integral to the resin polymer or co-polymer's backbone.

In addition, live, or active co-monomer, co-oligomer, co-polymer or a composition comprising one or more of the foregoing, can likewise be impregnated and embedded within a plurality of particulates, that can be the same or different as the particulates impregnated with the monomer, oligomer or polymer forming the resin's backbone. In other words, by entrapping, for example, the cross linking agent within particulates of the same or different material at predetermined concentrations that, depending on the resin-forming monomers, oligomers or polymers and their combination, both particles can be used in a single ink composition and only upon heating or exposure to a swelling agent, release the entrapped components for reacting and forming the resin. Final properties of the board, film, sheet or any other component or device formed accordingly can be tightly control by proper election of various factors, such as, for example:

a. type of monomer used (e.g., bisphenol-F);
b. average weight number MW of the resin-forming polymer/oligomer;
c. concentration within the primary particulate (W/W);
d. Primary particulates concentration (in other words, the particulates that, in an embodiment, are impregnated with the resin monomer (e.g., bisphenol-A)) in the ink (w/w)
e. Type of primary particulates (e.g., silica, mica etc.);
f. Primary particulates formation process (e.g., control pore size, etc);
g. type of cross-linking agent used (e.g., diethylene triamine);
h. average weight number MW of the cross-linking polymer/oligomer;
i. concentration of cross-linking agent within the secondary particulate (W/W);
j. Secondary particulates concentration (in other words, the particulates that, in an embodiment, are impregnated with the cross-linking agent (e.g., triethylene tetraamine)) in the ink (w/w);
k. Type of secondary particulates (e.g., silica, mica etc.);
l. Secondary particulates formation process (e.g., annealing to reduce Vf, etc), or a combination of factors comprising one or more of the foregoing.

Initiating the resin backbone can be done using an initiator, for example benzoyl peroxide (BP) and other peroxide-containing compounds. The term "initiator" as used herein generally refers to a substance that initiates a chemical reaction, specifically any compound which initiates polymerization, or produces a reactive species which initiates polymerization, including, for example and without limitation, co-initiators and/or photoinitiator(s).

The terms "live monomer", "live oligomer", "live polymer" or their counterparts (co-monomer e.g.,) combination refers in an embodiment to a monomer, a short group of monomers or a polymer having at least one functional group capable of forming a radical reaction (in other words, the reaction can be continued and is not otherwise terminated by an end-group) Likewise, the term "embedded", as used for example in connection with the monomer, oligomer, polymer, or their combination being embedded within the mesoporous particulates, is intended to mean that the embedded material is dispersed within the particulate of the mesoporous particulates as may be accomplished, for example, by blending the monomer, oligomer, polymer, or their combination with the materials used to prepare the, for example mesoporous particulate before it is formed into an particulate, e.g., a bead. For example, the live monomer, live oligomer, live polymer or their combination can be combined under certain circumstances with tetraethoxysilane (TEOS) to form mesoporous particle with the live monomer, live oligomer, polymer or their combination, entrapped within the particulate matter. The term "embedded" excludes live monomer, live oligomer, polymer or their combination applied (as in functionalized) to the surface of a preformed particulate of microporous material, or live monomer, live oligomer, or their combination material that has been applied to the surface of a preformed particulate of microporous material and allowed to be adsorbed to an area just below the surface of a preformed particulate of microporous material, as for example by applying ink to the surface of the preformed matrix (dipping). (According to the IUPAC definition, "micropores" are of a diameter<2 nm, "mesopores" have a diameter within the interval of 2-50 nm and "micropores" are of a diameter>50 nm.). Also, in an embodiment, the term "entrapped" refers to the retention for a period of time of the live monomer, live oligomer, live polymer or their combination in the interstitial free volume ($V_f$) of the silica.

Activation of the live monomer, live oligomer, live polymer or their combination, and thus allowing contact between the live monomer, live oligomer, or their combination and, for example, a cross-linking agent to initiate curing, can be caused by increase in the interstitial free volume ($V_f$) of the particulates, resulting from the heating either alone, or in the presence of a swelling agent present in the aqueous phase of the composition. The mechanism may be (without limitation) such that the heat increases the viscosity of the polymer encapsulated within the silica particles and their kinetic energy, once the $V_f$ is larger than the critical segment length of the polymer, oligomer or monomer or their combination, the polymer can begin to flow within the particulate which, in turn can cause the polymer chains to leach out.

Further, the term "impregnate" means for example, to fill throughout or to saturate the porous, or mesoporous particulates with the monomer, oligomer, polymer, or their combination. For example, the porous particulate is impregnated with the live monomer, live oligomer, or polymer or a combination thereof in a concentration of between about 5% and about 80% weight of the monomer, oligomer, polymer, or their combination per weight of the particulate (w/w).

The amount of live monomer, live oligomer, or their combination the porous particulates are impregnated with will change with the desired physic-chemical characteristic of the board, film or sheet sought to be formed. The live monomer, live oligomer or a combination thereof has a number average molecular weight ($\overline{MW_n}$), in other words the average number of monomers per chain of between 1 and about 2000, for example, $\overline{MW_n}$ between 1 and about 1000 or $\overline{MW_n}$ of between about 250 and about 750, specifically between about 300 and about 500.

In an embodiment, the cross-linking agent, co-monomer, co-oligomer, co-polymer or a composition comprising one or more of the foregoing and is used in the resin ink(s) provided, can be a part, or configured to form a solution, emulsion, or suspension within the resin ink compositions.

In another embodiment, the continuous phase comprises active components of a polymer capable of undergoing photoinitiation using a photoinitiator. Such live monomer, live oligomer, live polymer or their combination capable of undergoing photoinitiation can be for example, multifunctional acrylates, for example a multifunctional acrylate that can be multifunctional acrylate is selected from the group consisting of 1,2-ethanediol diacrylate, 1,3-propanediol diacrylate, 1,4-butanediol diacrylate, 1,6-hexanediol diacrylate, dipropylene glycol diacrylate, neopentyl glycol diacrylate, ethoxylated neopentyl glycol diacrylate, propoxylated neopentyl glycol diacrylate, tripropylene glycol diacrylate, bisphenol-A-diglycidyl ether diacrylate, hydroxypivalic acid neopentanediol diacrylate, ethoxylated bisphenol-A-diglycidyl ether diacrylate, polyethylene glycol diacrylate, trimethylolpropane triacrylate, ethoxylated trimethylolpropane triacrylate, propoxylated trimethylolpropane triacrylate, propoxylated glycerol triacrylate, tris(2-acryloyloxyethyl) isocyanurate, pentaerythritol triacrylate, ethoxylated pentaerythritol triacrylate, pentaerythritol tetraacrylate, ethoxylated pentaerythritol tetraacrylate, ditrimethylolpropane tetraacrylate, dipentaerythritol pentaacrylate and dipentaerythritol hexaacrylate.

Photoinitiators that can be used with the multifunctional acrylates described herein can be, for example radical photoinitiator. These radical photoinitiators can be, for example Irgacure® 500 from CIBA SPECIALTY CHEMICAL and Darocur® 1173, Irgacure® 819, Irgacure® 184, TPO-L (ethyl(2,4,6, trimethyl benzoil) phenyl phosphinate) benzophenone and acetophenone compounds and the like. For example, the radical photoinitiator can be cationic photoinitiator, such as mixed triarylsulfonium hexafluoroantimonate salts. Another example of the radical photoinitiator used in the active continuous phase described herein, can be 2-ispropylthioxanthone.

The printed pattern of the resin portion can be fabricated from resin-rich ink compositions, for example, suspensions, emulsions, solutions and the like. The term "resin-rich" refers to compositions in which larger proportions of polymer resin components are included than are needed to bind the pigment particles to each other and the resin layer to the underlying substrate, or another composite component layer, or support portion and their combination. For example, a resin-rich component layer may include polymer resins in amounts that are at least 95% by weight of the total resin ink weight including pigments. In those circumstances requiring that pigments be provided by the separate coloring printhead(s), resin-rich ink compositions can have up to 99.9% active monomers, oligomers and their combination.

As described, the parameters used in the step of selection of parameters related to the composite component performed by the CAM module used for the fabrication of the colored resin-metal composite components, can be, for example: the desired printing throughput, the resin pattern in the layer, the metallic pattern in the layer, the desired resin layer color, the coloring order of the resin pattern, curing requirements for the resin and/ormetallic pattern in the layer, the need and location of (removable) support layers, or a combination of parameters comprising one or more of the foregoing.

The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple (remote) locations.

The CAM module can comprise: a 2D file library storing the files converted from the 3D visualization files of the composite component; a processor in communication with the library; a memory device storing a set of operational instructions for execution by the processor; a micromechanical inkjet print head or heads in communication with the processor and with the library; and a print head (or, heads') interface circuit in communication with the 2D file library, the memory and the micromechanical inkjet print head or heads, the 2D file library configured to provide printer operation parameters specific to a functional layer; pre-processing Computer-Aided Design/Computer-Aided Manufacturing (CAD/CAM) generated information associated with the 3D resin metallic colored resin-metal composite component to be fabricated, thereby obtaining a plurality of 2D file; loading the plurality of 2D file s processed in the step of pre-processing from the composite component 3D visualization files onto the 2D file library; and using the 2D file library, instructing the processor to print the predetermined layer of the composite component in a predetermined order.

The 3D visualization file representing the composite component used for the fabrication of the colored resin-metal composite components, can be: an .asm, an STL, an IGES, a STEP, a Catia, a SolidWorks, a ProE, a 3D Studio, a Gerber, a Rhino file or a file comprising one or more of the foregoing; and wherein file that represents at least one, substantially 2D layer (and uploaded to the library) can be, for example, a JPEG, a GIF, a TIFF, a BMP, a PDF file, or a combination comprising one or more of the foregoing.

In certain embodiments, the CAM module further comprises a computer program product for fabricating one or more colored resin-metal composite component, for example, a toy, electronic component, machine part, a USB connector (see e.g., FIG. 1A, 1B) and the like. The printed component can be, for example, a medical device, an electronic device, or a toy comprising both discrete metallic components and resinous components that are each and both being printed optionally simultaneously or sequentially and continuously. The term "continuous" and its variants are intended to mean printing in a substantially unbroken process. In another embodiment, continuous refers to a layer, member, or structure in which no significant breaks in the layer, member, or structure lie along its length.

For example, and as illustrated in FIG. 1, a USB connector was printed using the methods described. The whole USB connector, the shell, and the connectors are printed continuously using the systems described whereby cured colored resin ink is used to form the resin portion and solvent-suspended metallic nanoparticles are used to form the metal portions of the USB connector.

The computer controlling the printing process described herein can comprise: a computer readable storage medium having computer readable program code embodied therewith, the computer readable program code when executed by a processor in a digital computing device causes a three-dimensional inkjet printing unit to perform the steps of: pre-processing Computer-Aided Design/Computer-Aided Manufacturing (CAD/CAM) generated information associated with the colored resin-metal composite component (in other words, the 3D visualization file representing the composite component) to be fabricated, thereby obtaining a plurality of 2D files (in other words, the file that represents at least one, substantially 2D layer for printing the composite component), each 2D file specific for a predetermined layer in a specific order; loading the plurality of 2D file s processed in the step of pre-processing onto a 2D file library; directing a stream of droplets of a metallic material from a first inkjet print head of the three-dimensional inkjet printing unit at a surface of a substrate; directing a stream of droplets of a colored resin material from a second inkjet print head of the three-dimensional inkjet printing unit at the surface of the substrate; alternatively or additionally directing a stream of droplets of a coloring material from a third inkjet print head of the three-dimensional inkjet printing unit at a surface of the metallic pattern and/or the resin pattern and/or a support portion pattern; optionally directing a stream of droplets of a support material from a fourth inkjet print head of the three-dimensional inkjet printing unit at a surface of the metallic pattern and/or the resin pattern; moving the first, second, optionally third, and optionally fourth inkjet heads relative to the substrate in an x-y plane of the substrate, wherein the step of moving the first, second, optionally third, and optionally fourth inkjet heads relative to the substrate in the x-y plane of the substrate, for each of a plurality of layers is performed in a layer-by-layer fabrication of the colored resin-metal composite component on the substrate.

In addition, the computer program, can comprise program code means for carrying out the steps of the methods described herein, as well as a computer program product comprising program code means stored on a medium that can be read by a computer, such as a floppy disk, a hard disk, CD-ROM, DVD, USB memory stick, or a storage medium that can be accessed via a data network, such as the Internet or Intranet, when the computer program product is loaded in the main memory of a computer and is carried out by the computer.

Memory device(s) as used in the methods described herein can be any of various types of non-volatile memory devices or storage devices (in other words, memory devices that do not lose the information thereon in the absence of power). The term "memory device" is intended to encompass an installation medium, e.g., a CD-ROM, floppy disks, or tape device or a non-volatile memory such as a magnetic media, e.g., a hard drive, optical storage, or ROM, EPROM, FLASH, etc. The memory device may comprise other types of memory as well, or combinations thereof. In addition, the memory medium may be located in a first computer in which the programs are executed (e.g., the 3D inkjet printer provided), and/or may be located in a second different computer which connects to the first computer over a network, such as the Internet. In the latter instance, the second computer may further provide program instructions to the first computer for execution. The term "memory device" can also include two or more memory devices which may reside in different locations, e.g., in different computers that are connected over a network. Accordingly, for example, the bitmap library can reside on a memory device that is remote from the CAM module coupled to the 3D inkjet printer provided, and be accessible by the 3D inkjet printer provided (for example, by a wide area network).

Unless specifically stated otherwise, as apparent from the following discussions, it is appreciated that throughout the specification discussions utilizing terms such as "processing," "loading," "in communication," "detecting," "calculating," "determining", "analyzing," or the like, refer to the action and/or processes of a computer or computing system, or similar electronic computing device, that manipulate and/or transform data represented as physical, such as a transistor architecture into other data similarly represented as physical structural (in other words, resin or metal/metallic) layers.

Furthermore, as used herein, the term "2D file library" refers to a given set of files that together define a single colored resin-metal composite component, or a plurality of colored resin-metal composite components used for a given purpose. The term can also be used to refer to a set of 2D files or any other raster graphic file format (the representation of images as a collection of pixels, generally in the form of a rectangular grid, e.g., BMP, PNG, TIFF, GIF), capable of being indexed, searched, and reassembled to provide the structural layers of a given colored resin-metal composite component, whether the search is for the colored resin-metal composite component, or a given specific layer.

The Computer-Aided Design/Computer-Aided Manufacturing (CAD/CAM) generated information associated with the colored resin-metal composite component to be fabricated used in the methods, programs and libraries for using inkjet printing based on converted CAD/CAM data packages can be, for example, IGES, DXF, DMIS, NC files, GERBER® files, EXCELLON®, STL, EPRT files, an .asm, a STEP, a Catia, a SolidWorks, a ProE, a 3D Studio, a Rhino file or a package comprising one or more of the foregoing. Additionally, attributes attached to the graphics objects transfer the meta-information needed for fabrication and can precisely define the colored resin-metal composite component image and the structure and color of the image (e.g., resin or metal), resulting in an efficient and effective transfer of fabrication data from design (3D visualization CAD e.g.,) to fabrication (CAM e.g.,). Accordingly and in an embodiment, using pre-processing algorithm, GERBER®, EXCELLON®, DWG, DXF, STL, EPRT ASM, and the like as described herein, are converted to 2D files.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

All ranges disclosed herein are inclusive of the endpoints, and the endpoints are independently combinable with each other. "Combination" is inclusive of blends, mixtures, alloys, reaction products, and the like. The terms "a", "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, when present, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

All ranges disclosed herein are inclusive of the endpoints, and the endpoints are independently combinable with each other. Furthermore, the terms "first," "second," and the like, herein do not denote any order, quantity, or importance, but rather are used to denote one element from another.

Likewise, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

Figure 1A:
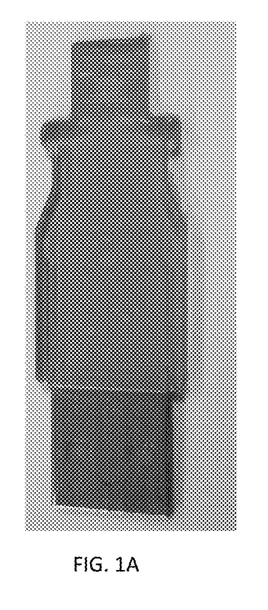
FIG. 1A, 1B Illustrates a composite electrical component, a USB connector printed using the methods disclosed and claimed.
Figure 1B:
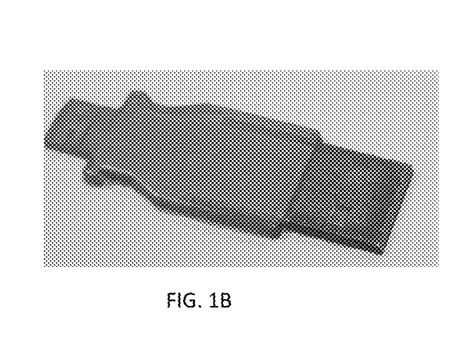

In an embodiment, provided herein is a method for fabricating a 3D colored resin-metal composite component using inkjet printer comprising: providing an ink jet printing system comprising: a first print head having: at least one aperture, a resin ink reservoir, and a resin pump configured to supply resin inkjet ink through the aperture; a second print head having: at least one aperture, a metallic ink reservoir, and a metallic ink pump configured to supply the metallic inkjet ink through the aperture; a third print head having: at least one aperture, a support ink reservoir, and a support ink pump configured to supply the support inkjet ink through the aperture; a conveyor, operably coupled to the first, the second and the third print heads configured to convey a substrate to each of the first, second, and third print heads; and a computer aided manufacturing ("CAM") module, comprising: a data processor; a non-volatile memory; and a set of executable instructions stored on the non-volatile memory for: receiving a 3D visualization file representing the composite component; generating a file that represents at least one, substantially 2D layer for printing the composite component; receiving a selection of parameters related to the composite component; and altering the file represents at least one, substantially 2D layer based on at least one of the selection of parameters, wherein the CAM module is configured to control each of the first, second and third print heads; providing the colored resin inkjet ink composition, the metallic inkjet ink composition and the support inkjet ink composition; using the CAM module, obtaining a generated file representing a first, substantially 2D layer of the composite component for printing, the 2D layer comprising a pattern representative of the colored resin inkjet ink, the metallic inkjet ink and the support inkjet ink; using the first print head, forming the pattern corresponding to the resin representation in the first, substantially 2D layer of the composite component for printing; curing the pattern corresponding to the resin representation in the 2D layer of the composite component; using the second print head, forming the pattern corresponding to the metal representation in the first, substantially 2D layer of the composite component for printing; sintering the pattern corresponding to the metal representation in the 2D layer of the composite component; removing the substrate, thereby fabricating a first composite component layer, wherein, before, simultaneously with or sequential to the steps of forming and the pattern corresponding to the resin representation in the first, substantially 2D layer of the composite and/or the steps of forming and sintering pattern corresponding to the metal representation in the first, substantially 2D layer of the composite, using the third print head, forming the pattern corresponding to the support representation in the first, substantially 2D layer of the composite component for printing and functionalizing the pattern corresponding to the metal representation in the 2D layer of the composite component, the method further comprising (i) using the CAM module, obtaining a generated file representing a subsequent, substantially 2D layer of the composite component for printing; and repeating the steps for forming a subsequent composite component layer, the inkjet printing system further comprises (ii) a third print head having: at least one aperture, a coloring ink reservoir, and a coloring pump configured to supply the coloring inkjet ink through the aperture, the method further comprising: providing coloring ink composition; and before or after the step of curing the predetermined pattern corresponding to the resin representation in the 2D layer of the composite component, using the third print head, coloring the layer of the composite component, wherein (iii) the first layer comprises heating, photopolymerizing, drying, depositing plasma, cross linking, annealing, facilitating redox reaction, or a combination comprising one or more of the foregoing, wherein (iv) the metallic ink composition comprises: metal nanoparticles having average diameter $D_{2,1}$ particle size between about 20 nm and about 150 nm; and optionally a solvent, wherein (v) the aspect ratio of the metal nanoparticles is substantially more than 1, wherein (vi) the resin ink composition is a suspension, an emulsion, a solution, or a composition comprising the foregoing, for example (vii), a solution of a multifunctional acrylate monomer, oligomer, polymer or their combination; a cross-linking agent; and a radical photoinitiator, and/or (viii) a suspension of porous particulates impregnated with a monomer, an oligomer, a polymer or a combination comprising the foregoing, wherein the monomer, oligomer, polymer or a combination thereof has a first terminal end coupled to the porous particulate and a second terminal end having for example, an epoxy functionality, wherein the monomer, oligomer, polymer, or their combination that is operably coupled to the porous particulates are entirely embedded within the particulates and configured to leach out of the porous particulate at a temperature of between about 60° C. and about 150° C., wherein (ix) the resin is: polyester (PES), polyethylene (PE), polyvinyl alcohol (PVOH), ply(vinylacetate) (PVA), poly-methyl methacrylate (PMMA), Poly(vinylpirrolidone), or a combination comprising a mixture or a copolymer of one or more of the foregoing, wherein (x) the step of using the first print head, and/or the second print head, further comprises providing a support, (xi) the support being a ceramic powder, a polymer composition, a silicon glass, or a removable support comprising one or more of the foregoing, wherein (xii) the parameters used in the selection of parameters related to the composite component are; the resin pattern in the layer, the metallic pattern in the layer, the color of the resin layer, the coloring order of the resin pattern, curing requirements for the resin and/or sintering for the metallic pattern in the layer, the removable support composition, throughput requirement, or a combination of parameters comprising one or more of the foregoing, wherein (xiii) the 3D visualization file representing the composite component is an .asm, an STL, an IGES, a STEP, a Catia, a SolidWorks, a ProE, a 3D Studio, a Gerber, a Rhino file or a file comprising one or more of the foregoing; and wherein file that represents at least one, substantially 2D layer is a JPEG, a GIF, a TIFF, a BMP, a PDF file, or a combination comprising one or more of the foregoing, wherein (xiv) the color is a pigment present in the resin ink composition at a concentration of between about 1% and about 5% (w/w), wherein (xv) the third print head is configured to apply multiple colors to at least a portion of a composite component layer, wherein (xvi) the inkjet printing system further comprises an additional print head having: at least one aperture, a second resin ink reservoir, and a second resin ink pump configured to supply the second resin ink through the aperture, the method further comprising: providing a second resin ink composition; using the second resin ink print head, forming a predetermined pattern corresponding to the second resin representation in the first, substantially 2D layer of the composite component for printing; and curing the predetermined pattern corresponding to the second resin representation in the 2D layer of the composite component; wherein the second resin ink composition has a different resin composition than the resin ink composition in the first print head and/or has a different color, the inkjet printing system further comprises (xvii) an additional print head having: at least one aperture, a second metallic ink reservoir, and a second metallic ink pump configured to supply the second metallic ink through the aperture, the method further comprising: providing a second metallic ink composition; using the second metallic ink print head, forming a predetermined pattern corresponding to the second metal representation in the first, substantially 2D layer of the composite component for printing; and sintering the predetermined pattern corresponding to the second metal representation in the 2D layer of the composite component, wherein the second metallic ink composition has a different metal than the metallic ink composition in the second print head, and/or (xviii) an additional print head having: at least one aperture, a second support ink reservoir, and a second support ink pump configured to supply the second support ink through the aperture, the method further comprising: providing a second support ink composition; before, simultaneously with, or subsequent to the steps of using the first print head and/or the second and/or the third print heads, using the second support ink print head, forming a predetermined pattern corresponding to the second support representation in the first, substantially 2D layer of the composite component for printing; and functionalizing the predetermined pattern corresponding to the support representation in the 2D layer of the composite component. Also provided as shown in FIGS. 1A and 1B, are colored composite component fabricated by the methods described and claimed herein.

Although the foregoing disclosure for 3D printing of colored resin-metal composite components using inkjet printing based on converted 3D visualization CAD/CAM data packages has been described in terms of some embodiments, other embodiments will be apparent to those of ordinary skill in the art from the disclosure herein. Moreover, the described embodiments have been presented by way of example only, and are not intended to limit the scope of the inventions. Indeed, the novel methods, programs, libraries and systems described herein may be embodied in a variety of other forms without departing from the spirit thereof. Accordingly, other combinations, omissions, substitutions and modifications will be apparent to the skilled artisan in view of the disclosure herein.

What is claimed:
1. A method for fabricating a 3D colored resin-metal composite component using inkjet printer comprising:
 a. providing an ink jet printing system comprising:
   i. a first print head having: at least one aperture, a resin ink reservoir, and a resin pump configured to supply resin inkjet ink through the aperture;
   ii. a second print head having: at least one aperture, a metallic ink reservoir, and a metallic ink pump configured to supply the metallic inkjet ink through the aperture;
   iii. a third print head having: at least one aperture, a support ink reservoir, and a support ink pump configured to supply the support inkjet ink through the aperture;
   iv. a conveyor, operably coupled to the first, the second and the third print heads configured to convey a substrate to each of the first, second, and third print heads; and
   v. a computer aided manufacturing ("CAM") module, comprising: a processor in communication with the first, second and third print beads; a non-volatile memory; and a set of executable instructions stored on the non-volatile memory for: receiving a 3D visualization file representing the composite component; generating a file that represents at least one, substantially 2D layer for printing the composite component; receiving a selection of parameters related to the composite component; and altering the file represents at least one, substantially 2D layer based on at least one of the selection of parameters, wherein the CAM module is configured to control each of the first, second and third print heads;
 b. providing the colored resin inkjet ink composition, the metallic inkjet ink composition and the support inkjet ink composition;
 c. using the CAM module, obtaining a generated file representing a first, substantially 2D layer of the composite component for printing, the 2D layer comprising a pattern representative of the colored resin inkjet ink, the metallic inkjet ink and the support inkjet ink;

d. using the first print head, forming the pattern corresponding to the resin representation in the first, substantially 2D layer of the composite component for printing;
e. curing the pattern corresponding to the resin representation in the 2D layer of the composite component;
f. using the second print head, forming the pattern corresponding to the metal representation in the first, substantially 2D layer of the composite component for printing;
g. sintering the pattern corresponding to the metal representation in the 2D layer of the composite component;
h. removing the substrate, thereby fabricating a first composite component layer, wherein, before, simultaneously with or sequential to the steps of forming and the pattern corresponding to the resin representation in the first, substantially 2D layer of the composite and/or the steps of forming and sintering pattern corresponding to the metal representation in the first, substantially 2D layer of the composite, using the third print head, forming the pattern corresponding to the support representation in the first, substantially 2D layer of the composite component for printing and functionalizing the pattern corresponding to the metal representation in the 2D layer of the composite component.

2. The method of claim 1, further comprising:
a. using the CAM module, obtaining a generated file representing a subsequent, substantially 2D layer of the composite component for printing; and repeating the steps for forming a subsequent composite component layer.

3. The method of claim 2, wherein the third print head comprises: at least one aperture, a coloring ink reservoir, and a coloring pump configured to supply the coloring inkjet ink through the aperture, the method further comprising:
before or after the step of curing the predetermined pattern corresponding to the resin representation in the 2D layer of the composite component, using the third print head, coloring the layer of the composite component.

4. The method of claim 3, wherein the step of curing the first layer comprises heating, photopolymerizing, drying, depositing plasma, cross linking, annealing, facilitating redox reaction, or a combination comprising one or more of the foregoing.

5. The method of claim 4, wherein the metallic ink composition comprises: metal nanoparticles having average diameter $D_{2,1}$ particle size between about 20 nm and about 150 nm; and optionally a solvent.

6. The method of claim 5, wherein the aspect ratio of the metal nanoparticles is substantially more than 1.

7. The method of claim 1, wherein the resin ink composition is a suspension, an emulsion, a solution, or a composition comprising the foregoing.

8. The method of claim 7, wherein the resin ink is a solution of a multifunctional acrylate monomer, oligomer, polymer or their combination; a cross-linking agent; and a radical photinitiator.

9. The method of claim 7, wherein the resin ink is a suspension of porous particulates impregnated with a monomer, an oligomer, a polymer or a combination comprising the foregoing, wherein the monomer, oligomer, polymer or a combination thereof has a first terminal end coupled to the porous particulate and a second terminal end having for example, an epoxy functionality, wherein the monomer, oligomer, polymer, or their combination that is operably coupled to the porous particulates are entirely embedded within the particulates and configured to leach out of the porous particulate at a temperature of between about 60° C. and about 150° C.

10. The method of claim 8, wherein the resin is: polyester (PES), polyethylene (PE), polyvinyl alcohol (PVOH), ply(vinylacetate) (PVA), poly-methyl methacrylate (PMMA), Poly(vinylpirrolidone), or a combination comprising a mixture or a copolymer of one or more of the foregoing.

11. The method of claim 1, wherein the step of using the first print head, and/or the second print head, further comprises providing a support.

12. The method of claim 11, wherein the support is a ceramic powder, a polymer composition, a silicon glass, or a removable support comprising one or more of the foregoing.

13. The method of claim 12, wherein the parameters used in the selection of parameters related to the composite component are; the resin pattern in the layer, the metallic pattern in the layer, the color of the resin layer, the coloring order of the resin pattern, curing requirements for the resin and/or sintering for the metallic pattern in the layer, the removable support composition, throughput requirement, or a combination of parameters comprising one or more of the foregoing.

14. The method of claim 1, wherein the 3D visualization file representing the composite component is an .asm, an STL, an IGES, a STEP, a Catia, a SolidWorks, a ProE, a 3D Studio, a Gerber, a Rhino file or a file comprising one or more of the foregoing; and wherein file that represents at least one, substantially 2D layer is a JPEG, a GIF, a TIFF, a BMP, a PDF file, or a combination comprising one or more of the foregoing.

15. The method of claim 14, wherein the color is a pigment present in the resin ink composition at a concentration of between about 1% and about 5% (w/w).

16. The method of claim 3, wherein the third print head is configured to apply multiple colors to at least a portion of a composite component layer.

17. The method of claim 1, wherein the inkjet printing system further comprises an additional print head having: at least one aperture, a second resin ink reservoir, and a second resin ink pump configured to supply the second resin ink through the aperture, the method further comprising:
a. providing a second resin ink composition;
b. using the second resin ink print head, forming a predetermined pattern corresponding to the second resin representation in the first, substantially 2D layer of the composite component for printing; and
c. curing the predetermined pattern corresponding to the second resin representation in the 2D layer of the composite component;
wherein the second resin ink composition has a different resin composition than the resin ink composition in the first print head and/or has a different color.

18. The method of claim 17, wherein the inkjet printing system further comprises an additional print head having: at least one aperture, a second metallic ink reservoir, and a second metallic ink pump configured to supply the second metallic ink through the aperture, the method further comprising:
a. providing a second metallic ink composition;
b. using the second metallic ink print head, forming a predetermined pattern corresponding to the second metal representation in the first, substantially 2D layer of the composite component for printing; and c. sintering the predetermined pattern corresponding to the second metal representation in the 2D layer of the composite component, wherein the second metallic ink composition has a different metal than the metallic ink composition in the second print head.

19. The method of claim 18, wherein the inkjet printing system further comprises an additional print head having: at least one aperture, a second support ink reservoir, and a second support ink pump configured to supply the second support ink through the aperture, the method further comprising:

a. providing a second support ink composition;
b. before, simultaneously with, or subsequent to the steps of using the first print head and/or the second and/or the third print heads, using the second support ink print head, forming a predetermined pattern corresponding to the second support representation in the first, substantially 2D layer of the composite component for printing; and
c. functionalizing the predetermined pattern corresponding to the support representation in the 2D layer of the composite component.

\* \* \* \* \*